(12) United States Patent
Gaither et al.

(10) Patent No.: US 6,195,650 B1
(45) Date of Patent: Feb. 27, 2001

(54) METHOD AND APPARATUS FOR VIRTUALIZING FILE ACCESS OPERATIONS AND OTHER I/O OPERATIONS

(75) Inventors: Blaine D. Gaither; Bret A. McKee; Gregory W. Thelen, all of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/498,798

(22) Filed: Feb. 2, 2000

(51) Int. Cl.⁷ .................................................. G06F 12/00
(52) U.S. Cl. ...................... 707/1; 707/1; 707/2; 707/10; 707/101; 707/200; 707/204; 707/206; 711/114; 711/3; 709/100
(58) Field of Search .................................. 707/1, 205, 2, 707/10, 101, 200, 204, 103, 206; 711/117, 120, 6, 114, 3, 102, 103, 147, 202; 370/395, 399; 709/203, 236, 310, 100, 227, 321

(56) References Cited

U.S. PATENT DOCUMENTS

| | | | |
|---|---|---|---|
| 5,088,026 | * | 2/1992 | Bozman et al. ........................... 711/3 |
| 5,088,031 | * | 2/1992 | Takasaki et al. ...................... 709/100 |
| 5,561,799 | * | 10/1996 | Khalidi et al. .......................... 707/200 |
| 5,603,003 | * | 2/1997 | Akizawa et al. ...................... 711/114 |
| 5,758,184 | * | 5/1998 | Lucovsky et al. ......................... 710/6 |
| 5,802,397 | * | 9/1998 | Melo ................................... 709/232 |

* cited by examiner

Primary Examiner—Thomas G. Black
Assistant Examiner—Diane Mizrahi
(74) Attorney, Agent, or Firm—David A. Plettner (57) ABSTRACT

A method and apparatus virtualizes file access operations and other I/O operations in operating systems by performing string substitutions upon a file paths or other resource identifiers to convert the virtual destination of an I/O operation to a physical destination. In accordance with the present invention, a virtual file system translation driver is interposed between a file system driver and applications and system utilities. The virtual file system translation driver receives file access requests from the applications and system utilities, and translates the file path to virtualize the file system. In a first embodiment, the file system is partially virtualized and a user can see both the virtual file paths and the physical file paths. In second and third embodiments, the file system is completely virtualized from the point of view of the applications and system utilities. In the second embodiment, a user may start with a physical file system, and virtualize the file system by installing the virtual file system translation driver. When the driver is initially installed, all virtual file paths will be considered to translate to identically named physical file paths by default. In the third embodiment, virtual translations are automatically generated for all file paths when files and directories are created, and virtual file paths may bear limited, or no resemblance to physical file paths.

1 Claim, 7 Drawing Sheets

METHOD AND APPARATUS FOR VIRTUALIZING FILE ACCESS OPERATIONS AND OTHER I/O OPERATIONS

FIELD OF THE INVENTION

The present invention is a method and apparatus for virtualizing file access operations and other I/O operations in operating systems. More specifically, the present invention virtualizes file access operations and other I/O operations by performing string substitutions upon file paths or other resource identifiers to convert the virtual destination of an operation to a physical destination.

DESCRIPTION OF THE RELATED ART

In the art of computing, an operating system is typically used to provide access to the resources of a computer system. One important type of resource that must be accessed is the file system. Typically, a file system provides access to files on a local hard drive, as well as files that may reside on a network server, which is coupled to the computer system via a network.

One trend that has been important to the evolution of computing is to virtualize resources, thereby provided a computer program with a virtualized version of a resource and making the actual (or physical) attributes of a resource invisible to the program. For example, virtual memory systems, which are well known in the art, provide a computer program with the illusion that the program can access a large contiguous area of memory, which is known in the art as virtual memory. The operating system manages translations between virtual memory and physical memory. Contiguous regions of virtual memory may be mapped to non-contiguous regions of physical memory, and portions of virtual memory may be stored in a swap file on a hard disk drive of the computer system. This allows the computer system to execute programs requiring more memory than is physically available in the computer system, and allows multiple programs to be active simultaneously. Other examples of vitalized resources include multiple CPUs, and multiple windows in a windowed operating system.

Despite the trend toward virtualizing computer system resources, file systems tend to have very limited virtualization features. Typically, once the physical location of a hard drive, and the directory structure and files contain thereon, has been defined, a computer program is locked into this structure. For example, consider a simple example faced by many computer users using the Windows NT® or Windows® 98 operating system which are products of Microsoft® Corporation. A computer user purchases a computer system with a single hard drive that is referenced as "c:\". Over time, the user fills up the hard drive, and therefore adds a second hard drive that will typically be referenced as "d:\". To recover space on the original "c:\" drive, the user may wish for example, to move the contents of the directory "c:\Program Files" to "d:\Program Files". However, doing so causes many problems. For example, all the shortcuts for accessing programs from the start menu still refer to the "c:\" drive, so the user will no longer be able to launch the programs. Furthermore, the registry contains numerous references to the programs that were previously stored on the "c:\" drive. Typically, the user must reinstall all the applications that are to be moved to the "d:\" drive, or purchase and execute a third party utility that attempts to find every reference to the moved applications in shortcuts, the registry, or any other place where a reference may be located, and alter those references. Both processes are cumbersome, and may not be completely effective There are a number of mechanisms known in the art that can virtualize file system access operations to a limited extent. For example, in the Windows NT® or Windows® 98 operating system, a global variable called "Temp" is typically defined that allows all programs to access a common temporary directory. By changing the file path contained in the variable, the location of the temporary directory used by all programs can also be changed.

Two other mechanisms common in Unix® operating systems are symbolic links and hard links. Unix® is a trademark of the Open Group. In the Unix® operating system, each file and directory location is defined by an "ionode" number, and the file system directory maintains mappings between file and directory names and ionode numbers. A hard link is simply a second mapping between a file or directory name and an ionode number that has already been mapped to a first name. The file or directory is not actually deleted until all file and directory names that map to the ionode number have been deleted. Hard links must reference files and directories on the same file system, are transparent to the application, and cannot be used to arbitrarily re-map between partitions or devices because the ionode numbers only refer to files and directories within the file system.

In contrast, a symbolic link is a separate file with its own ionode number. The symbolic link contains a text string that points to another file or directory. Accordingly, symbolic links can be used to reference files and directories in different file systems. Symbolic links are not transparent to the application, since the application can detect that it is accessing a link and not the actual file or directory. Furthermore, deleting a symbolic link deletes the link, not the file or directory. Like hard links, symbolic links translate a single file or directory from one location to another. However, symbolic links may be arbitrarily re-mapped from one file system to another.

Mount points can also virtualize file systems to some extent. A mount point simply allows a drive volume to be mounted at some point within an existing directory tree structure. For example, assume that a hard drive on a file sever has a root directory, and under the root directory are a series of directories, with each directory identified by the initials of the user that uses that directory. When a user logs in, a drive volume is mounted at the directory corresponding to the users initials. When the user accesses that drive volume, the user only sees directories and files beneath the mounting point, and does not see the directories of the other users. Mount points are transparent to applications and can be re-mapped arbitrarily, but do not provide file level granularity and do not re-map directories underneath the mount point.

Finally, some enterprise storage subsystems have the ability to move a user's file system from one hard drive to another. Such moves can be performed arbitrarily and are transparent to applications, but do not provide file or directory level granularity.

Taken individually, none of these mechanisms provides a means to arbitrarily re-map files and directories at any level and between any file system in a manner that is transparent to applications. In essence, none of these mechanisms is capable of providing applications with a "virtual view" of the file system. What is needed in the art is a mechanism that can arbitrarily re-map files and directories at any level and between any file system in a manner that is transparent to applications. In essence, what is needed in the art is a mechanism capable of completely virtualizing an application's view of the file system, just as a virtual memory system virtualizes an application's view of a physical memory system.

SUMMARY OF THE INVENTION

The present invention provides a method and apparatus for virtualizing file access operations and other I/O operations in operating systems by performing string substitutions upon a file paths or other resource identifiers to convert the virtual destination of an I/O operation to a physical destination. In accordance with the present invention, a virtual file system translation driver is interposed between a file system driver and applications and system utilities. The virtual file system translation driver receives file access requests from the applications and system utilities, and translates the file path to virtualize the file system. The virtual file system translation driver can also be combined with the file system driver to create a combined virtual file system driver. The present invention can be utilized on workstations, network servers, and other computing devices.

In a first embodiment of the invention, the file system is partially virtualized and a user can see both the virtual file paths and the physical file paths. In this embodiment, the virtual file path is translated to a physical file path if a translation exists, and the file access operation is processed using the physical file path. If no translation exists, the file path provided by the application or utility is used to process the file access request.

In second and third embodiments of the present invention, the file system is completely virtualized from the point of view of the applications and system utilities. In the second embodiment, a user may start with a physical file system, and virtualize the file system by installing the virtual file system translation driver. When the driver is initially installed, all virtual file paths will be considered to translate to identically named physical file paths by default. In the third embodiment, virtual translations are automatically generated for all file paths when files and directories are created, and virtual file paths may bear limited, or no resemblance to physical file paths.

One of the disadvantages provided by prior art file system is that the attributes of a particular storage device apply globally to all files in the file system. In essence, the attributes of the storage device are "joined at the hip" with the file system installed on the storage device. The present invention breaks this connection. Accordingly, a user can view a single file system, yet files within that file system can be stored on storage devices having different attributes. The present invention provides many other advantages and may be implemented in several ways, as described in greater detail below.

DETAILED DESCRIPTION OF THE PREFERRED EMBODIMENTS

The present invention provides a method and apparatus for virtualizing file access operations and other I/O operations in operating systems by performing string substitutions upon a file paths or other resource identifiers to convert the virtual destination of an operation to a physical destination. Before discussing the present invention in detail, first consider a typical prior art computer system that uses the Windows NT® operating system, which is a product of Microsoft® Corporation. Those skilled in the art will understand how to apply the concepts discussed herein to other operating systems, such as Unix®. Unix® is a trademark of the Open Group.

Figure 1:
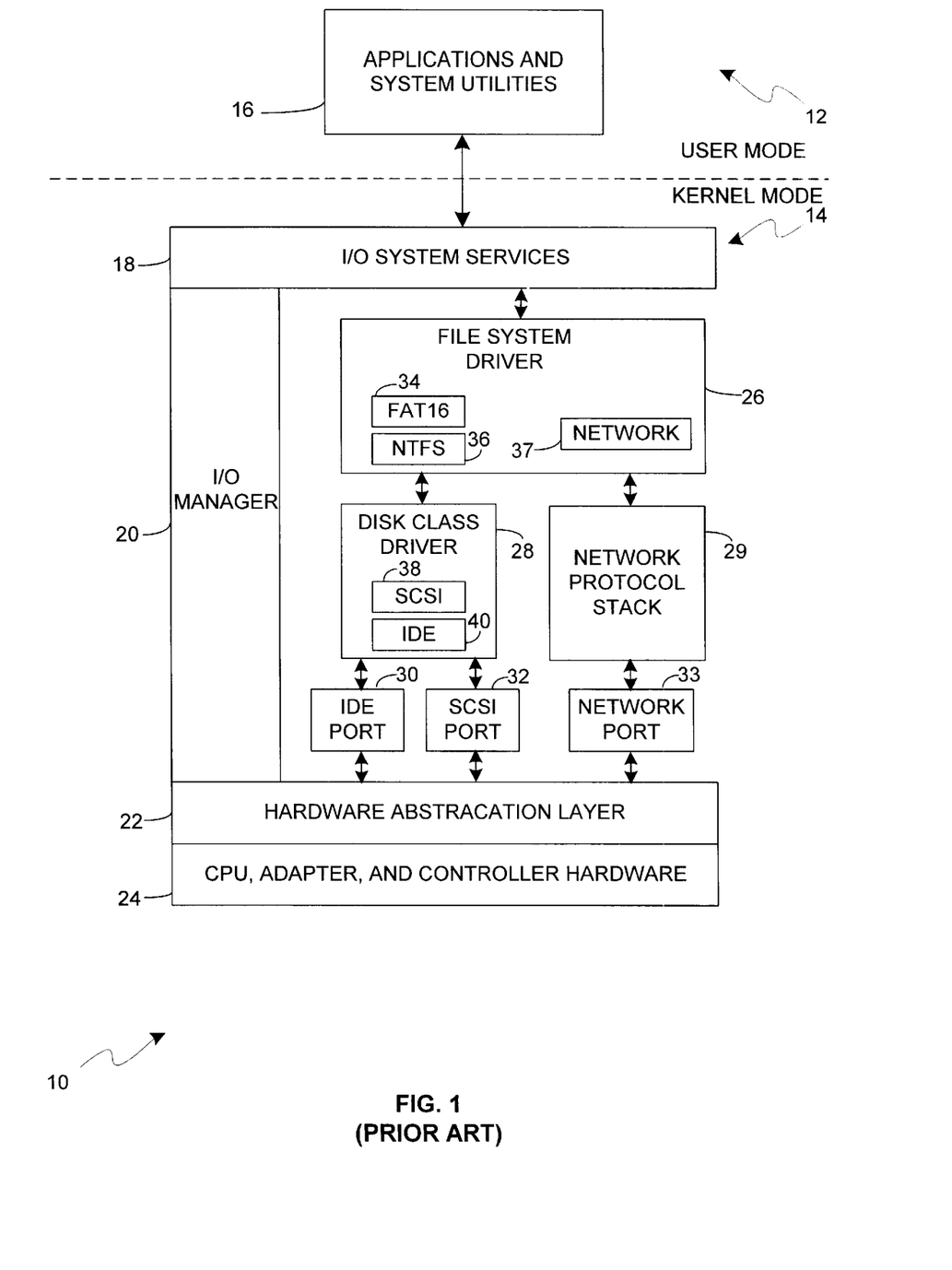
FIG. 1 shows portions of a prior art computer system that are required to understand a file system of the prior art computer.

FIG. 1 shows a prior art computer system 10. Only those portions of computer system 10 that are required to understand the file system are shown in FIG. 1. The operating system executes instructions in user mode 12 and kernel mode 14. Typically, applications and system utilities 16 are executed in user mode 12, and I/O system services 18 are executed in kernel mode 14.

I/O system services 18 represents all I/O functions of computer system 10. I/O system services 18 include an I/O manager 20, which manages I/O operations and will be discussed in greater detail below. CPU, adapter, and controller hardware block 24 represents the physical computing resources of computer system 10. Hardware abstraction layer 22 couples block 24 to I/O manager 20. The purpose of hardware abstraction layer 22 is to communicate with the resources represented by block 24 (which typically vary between different computer systems) and provide a uniform "abstracted" view of these resources to I/O manager 20.

In FIG. 1, those portions of I/O manager 20 that manage access to the file system are file system driver 26, disk class driver 28, network protocol stack 29, IDE port 30, SCSI port 32, and network port 33. File system driver 26 receives file access requests from applications and system utilities 16. File system driver 26 determines whether a file access request is attempting to access a file on a local hard drive, or a networked drive. If the file access request is attempting to access a local hard drive, the request is processed by FAT 16 block 34 or NTFS block 36 based on the type of file system used on the partition that is the target of the request. The FAT 16 and NTFS file systems are the most common file systems used on a Windows NT® workstation, but of course, other file systems are known in the art. If the file access request is attempting to access a networked drive, the request is processed by network block 37.

Assume that the file access request is attempting to access a local hard drive. The request is translated to access the appropriate hard drive sectors based on the file system, and is passed to disk class driver 28. If the target of the request is a SCSI drive, SCSI block 38 handles the request. If the target of the request is an IDE drive, IDE block 40 handles the request. While the SCSI and IDE interfaces are the most common methods of connecting hard drives to computer system, other connection methods are known in the art. Thereafter, the request is passed to IDE port 30 or SCSI port 32 (based on the hard drive interface type), and the request is completed by hardware abstraction layer 22, and CPU, adapter, and controller block 24. The results of the file access request then flow back up to applications and system utilities 16.

Returning to file system driver 26, now assume that the file access request is attempting to access a networked drive. As mentioned above, such a request is processed by network block 37. The request flows through network protocol stack 29 and to network port 33, and the request is complete by hardware abstraction layer 22 and CPU, adapter, and controller block 24. The results of the file access request then flow back up to applications and system utilities 16. Note that many types of network protocols are known in the art. For example, it is common for networked computer systems to communicate via the TCP/IP protocol over an Ethernet network.

Figure 2:
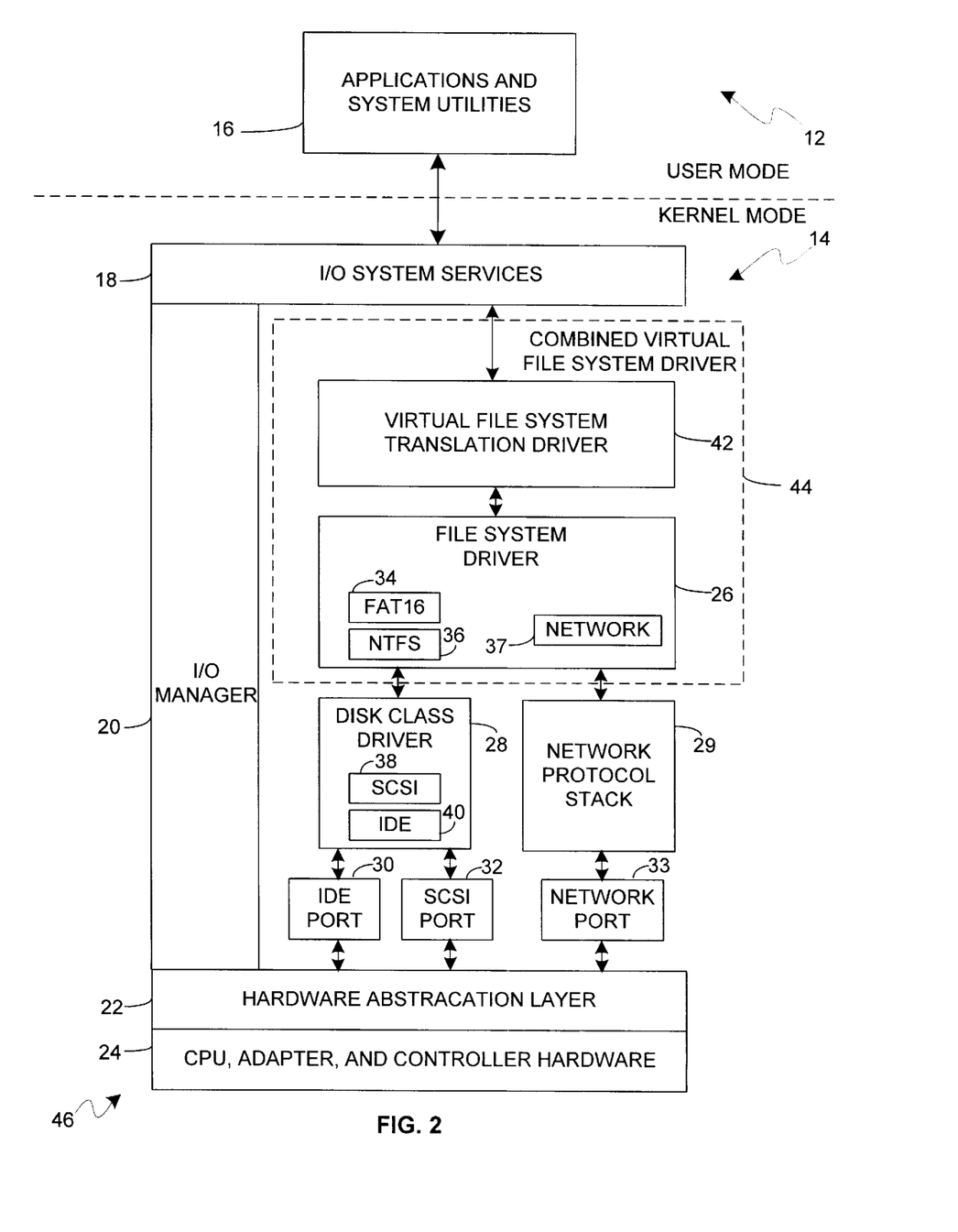
FIG. 2 shows a computer system having a virtual file system translation driver in accordance with the present invention.

FIG. 2 shows computer system 46 having a virtual file system translation driver 42 in accordance with the present invention. Note that most of the other components of computer system 46 are similar to the corresponding components of computer system 10 of FIG. 1, and therefore have the same reference numerals as the corresponding components of computer system 10.

Virtual file system translation driver 42 is interposed between file system driver 26 and applications and system utilities 16, and may be installed as a separate driver in Windows NT®. Virtual file system translation driver 42 receives file access requests from applications and system utilities 16, and translates the file path to virtualize the file system. Note that computer system 46 also includes a dotted line box labeled combined virtual file system driver 44. Combined virtual file system driver 44 includes virtual file system translation driver 42 and file system driver 26, and is included to show that drivers 42 and 26 can be combined into a single driver 44. While the discussion that follows will be primarily with reference to virtual file system translation driver 42, those skilled in the art will understand how to adapt the teachings contained herein to combine drivers 42 and 26 to create combined virtual file system driver 44.

There are many different embodiments and configurations of the present invention, which will be described below. The present invention can be used to provide complete or partial virtual translation. The present invention can allow individual files and directory paths to be virtualized based on site requirements, system requirements, applications, users, processes, or any other variable, such as the time of day. The virtual translations can be defined by a local user or administrator, by a remote administrator, or can be generated automatically. The virtual translations can be defined by a network administrator and stored on a network drive, with a cached copy of the most recently received translations stored on a workstation to allow the workstation to function when not connected to a network. The virtual translations can also be defined as a hierarchy that includes preferred translations and mandatory translations. The present invention can also reside on a network server, thereby allowing networked drives to be virtualized on the server side. Finally, the present invention can be adapted to work with other types of I/O operations. For example, print requests can be virtualized, as will be described below.

To illustrate a first embodiment of the present invention, consider an example similar to the one discussed above in the "Description of the Related Art". A computer user purchases a computer system with a single hard drive that is referenced as "c:\". Over time, the user fills up the hard drive, and therefore adds a second hard drive that will typically be referenced as "d:\". To recover space on the original "c:\" drive, the user moves the contents of the directory "c:\Program Files" to "d:\Program Files", and the contents of the directory "c:\My Documents" to "d:\My Documents". As discussed above, simply moving the directories will "break" the applications because shortcuts and registry entries will still point to the "c:\" drive.

In this embodiment, assume that translations are stored in a file called "vftranslate.ini". More complex translation databases will be discussed below and would typically be used in other embodiments. For example, it maybe desirable to store translations in the registry. However, in this embodiment, assume that the user either manually edits the file "vftranslate.ini" or uses a utility that manages the file so that the file includes the following entries:

| Contents of "vftranslate.ini" | |
|---|---|
| • | • |
| • | • |
| c:\Program Files\* | d:\Program Files\* |
| c:\My Documents\* | d:\My Documents\* |
| • | • |
| • | • |

Each line of the file "vftranslate.ini" contains a virtual translation. The first entry is is the virtual file path and the second entry is the physical file path to which the virtual path will be translated. Note that conventional wild card characters are used in the above example, with a "*" used to match any number of characters following the string.

Figure 3:
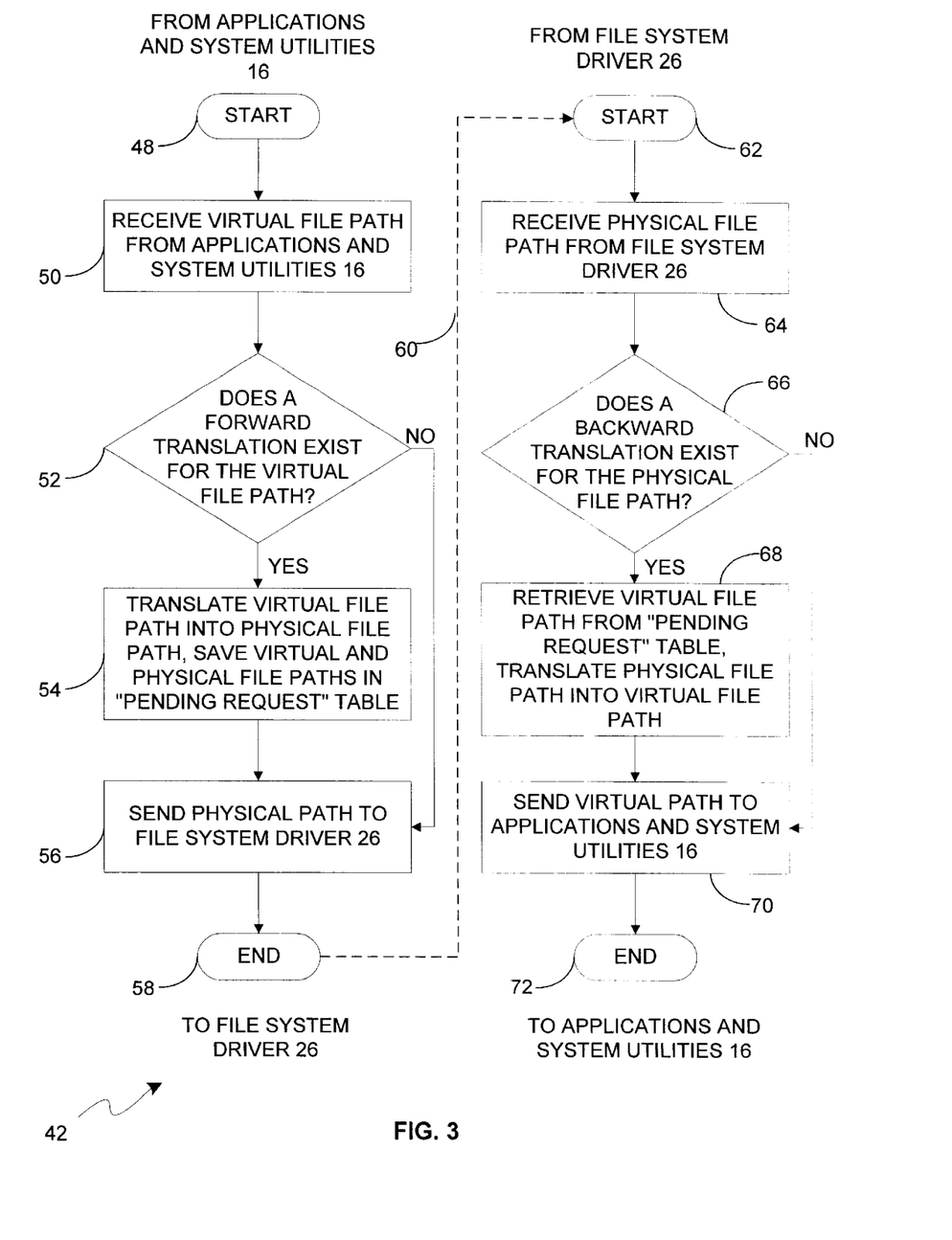
FIG. 3 is a flow chart showing how the virtual file system translation driver of FIG. 2 translates file requests from applications and system utilities in accordance with a first embodiment of the invention.

FIG. 3 is a flow chart showing how vita file system translation driver 42 translates file requests from applications and system utilities 16 in the first embodiment of the invention. Assume that a user attempts open a file called "c:\My Documents\letters\document.wpd" from a word processor program. In FIG. 2, the file access request is sent from applications and system utilities 16 to virtual file system translation driver 42. Referring to FIG. 3, in a first phase of the file access request, driver 42 begins execution at "start" block 48, and receives the virtual file path "c:\My Documents\letters\document.wpd" from applications and system utilities 16 at block 50.

Decision block 52 determines whether a forward translation exists for the virtual file path. If no virtual translation exists, then the virtual file path is equivalent to the physical file path, and the "NO" branch is taken to block 56, where the physical file path is sent on to file system driver 26 of FIG. 2. However, in this example the file "vftranslates.ini" contains a translation for "c:\My Documents\*", so the "YES" branch is taken to block 54. Block 54 performs a string substitution upon the virtual path by replacing "c:\My Documents\" with "d:\My Documents". Accordingly, the virtual file path is translated from "c:\My Documents\letters\document.wpd" to the physical file path "d:\My Documents\letters\document.wpd". Block 54 also stores the virtual and physical file paths in a "pending request" table that allows the request to be uniquely identified. The reason for storing the virtual and physical file paths in the pending request table will be described below.

Control then passes to block 56, where the physical file path is sent to file system driver 26, and execution of the first phase terminates at "end" block 58. At this point, the file access request is serviced by file system driver 26 and the other components shown in FIG. 2.

After the file access request has been serviced, the results will flow back up to virtual file system translation driver 42 from file system driver 26. This is represented in FIG. 3 by dotted line 60. Accordingly, the second phase of the file access request begins at "start" block 62. At block 64, the physical file path from file system driver 26 is received by virtual file system translation driver 42. Note that the physical file path may be accompanied by an error message, such as "file d:\My Documents\letters\document.wpd not found", or may be accompanied by an indication that the file has been opened and may be accessed. Whatever information flows between file system driver 26 and applications and system utilities 16 in FIG. 1 will flow through virtual file system translation driver 42 in FIG. 2, except that the path may be translated.

Next, decision block 66 determines whether a backward translation exists for the physical file path by accessing the pending request table. If there is no backward translation, the physical file path from file system driver 26 is equivalent to the virtual file path, the "NO" branch is taken to block 70, and the virtual file path is sent to applications and system utilities 16. However, in this example a backward translation exists so the "YES" branch is taken to block 68. Using the physical file path, block 68 retrieves the virtual file path from the pending request table and translates the physical file path back to the virtual file path. Accordingly, the physical file path is translated from "d:\My Documents\letters\document.wpd" back to the virtual file path "c:\My Documents\letters\document.wpd". Control then passes to block 70 and the virtual file path is sent to applications and system utilities 70, along with all other information associated with the file access request. Finally, execution terminates at "end" block 72.

One of the advantages provided by the present invention is that the process of re-mapping directories can be done on-the-fly without having to reboot the computer. For example, the directory tree of a program can be moved to another location, with the file "vftranslate.ini" updated by the computer user to reflect the new location, and the program can be immediately executed. Even though all shortcuts and registry entries point to the old physical file paths of the program, the present invention will virtualize the old file paths to the new physical file paths and the program will function normally.

In the above example, there is a one-to-one correspondence between the virtual and physical file paths. Accordingly, the pending request table is not actually needed because it would be possible to resolve the physical file path back to the virtual file path by simply using the information contained in the file "vftranslate.ini". However, while a virtual file path must always resolve to a single physical file path going forward, a physical file path can resolve to multiple virtual file paths going backward.

For example, consider that a computer user is having trouble with various versions of a DLL file. The acronym "DLL" stands for dynamic link library, and DLL files allow executable routines, generally serving a specific function or set of functions, to be stored separately as files with .DLL extensions. One common problem with the Windows® family of operating systems is that different versions of a DLL may be stored in various directories, and the installation of one program may overwrite a version of a DLL file required by another program, thereby "breaking" the other program. In this example, assume that the user suspects that the file "msvcrt40.dll" (which contains the Microsoft® Visual C++ v4.0 runtime library) is the problem. Rather than check the versions of all copies of the file "msvcrt40.dll" present on the hard drive (which may entail, for example, renaming each occurrence "mgvcrt40.dll" to "msvcrt40.old", and coping the latest version of "msvcrt40.dll" to each directory where the file is located), the user can simply copy the latest version of the file "msvcrt40.dll" to the directory "c:\dll_library" and add the following entry to the file "vftranslate.ini":

| Contents of "vftranslate.ini" | |
|---|---|
| • | |
| • | |
| • | |
| *\msvcrt40.dll | c:\dll_library\msvcrt40.dll |
| c:\Program Files\* | d:\Program Files\* |
| c:\My Documents\* | d:\My Documents\* |
| • | |
| • | |
| • | |

The user can then test the program which is failing, and all references to the file "msvcrt40.dll", regardless of the target directory, will be translated to "c:\dll_library\msvcrt40.dll". In this example, virtual file system translation driver 42 will not be able to use the file "vftranslate.ini" to translate back to the virtual file path because many virtual file paths may translate to the physical file path. This is why a pending request table is required in blocks 54 and 68 in FIG. 3. Note that a pending request table is not required if only one file access request is allowed to be pending at any given time. If multiple requests are allowed to be pending, but requests are guaranteed to complete in order, the pending request table can be implemented by a first-in first-out queue and only the virtual file paths need to be stored in the queue. Finally, if multiple requests are allowed to be pending and are allowed to complete out-of-order, the pending request table can be implemented as a table that associates the virtual file paths with physical file paths, and the table must be capable of having enough entries to represent the maximum number of pending file access requests.

The above example also illustrates another advantage of the present invention. The present invention is not limited to simply translating directories. Rather, the present invention also provides file-level granularity when defining virtual-to-physical file path translations.

In the above example, note that the file "vftranslate.ini" may actually contain two or more translations for the file "msvcrt40.dll". For example, assume that a program attempts to access "c:\Program Files\Microsoft Office\msvcrt40.dll". This virtual path has two different translations in the file "vftranslate.ini". In this embodiment, assume that the first valid translation in the file "vftranslate.ini" is the translation that will be used. Accordingly, an attempt to access "c:\Program Files\Microsoft Office\msvcrt40.dll" will translate to the physical file path "c:\dll_library\msvcrt40.dll". More sophisticated translation hierarchies will be described below.

Also note that it is typically desirable to give priority to more specific translations over less specific translations. For example, one would typically want a translation from the virtual file path "c:\Program Files\Microsoft Office\Word\*" to the physical file path "c:\Program Files\Microsoft Office\Word_Beta\*" to take precedence over a translation from the virtual file path "c:\Program Files\*" to the physical file path "d:\Program Files\*".

Note that in the first embodiment of the present invention, it may be desirable to create a translation from a virtual file path name to a null physical file path name. One reason creating such a null translation is to hide an existing physical file path from a user by translating the existing physical file path (as the virtual part of the translation) to the null physical file path. One way of creating a null translation is to select a physical file path for the translation that does not exist on the disk, and is unlikely to be created, such as a very long physical path name comprised of random characters. Alternatively, a special null physical file path may be defined, and flow chart 42 of FIG. 3 can be modified to trap this special null physical file path and return a "file path not found" message, similar to the way a file access creation request that identifies a virtual file path name that already exists as a physical file path name in a translation is trapped by block 82 of flow chart 42 of FIG. 4 in the second embodiment, as described below.

In the first embodiment of the invention described above, the file system is not truly virtualized because the user can see both the virtual file paths and the physical file paths. For example, if the user viewed the directory "c:\Program Files" and the directory "d:\Program Files", the directories would appear to be identical. In certain circumstances, this may cause problems. Consider that a user originally has Visio® 5.0, which is a product of Visio Corporation, installed in "c:\Program Files\Visio". As in the example above, the user moves "c:\Program Files" to "d:\Program Files", and configures all file access requests to "c:\Program Files" to translate to "d:\Program File". At this point, the program functions normally. Now assume that the user wishes to upgrade to Visio® 2000, but also wishes to maintain the previous version. The user may forget that program is actually stored on the "d:\" drive. This would be quite easy to do since the program appears to exist on the "c:\" drive. Thinking that Visio® 5.0 exists on the "c:\" drive, the user directs the Visio® 2000 installation program to install Visio® 2000 in the directory "d:\Program Files\Visio". The installation program may not detect that it is overwriting the old version since all registry entries indicate that the old version is installed on the "c:\" drive.

The second and third embodiments of the present invention addresses such potential problems by completely virtualizing the view of the file system from the point of view of the applications and system utilities. In the second embodiment, a user may start with a physical file system, and virtualize the file system by installing virtual file system translation driver 42 and an associated translation configuration utility, which will be described below. When driver 42 is initially installed, all virtual file paths will be considered to translate to identically named physical file paths by default. In the third embodiment, virtual translations are automatically generated for all file paths when files and directories are created, and virtual file paths may bear limited, or no resemblance to physical file paths.

The second embodiment of the present invention will be described first. As mentioned above, in the second embodiment the user may start with a physical file system. Assume that this is true in the following discussion, and when driver 42 is initially installed, all virtual file paths will be defined to translate to identically named physical file paths by default. Using the first embodiment described above as a starting point, several additional rules and steps must be added to completely virtualize the file system. First, consider the translations that are defined in the file "vftranslate.ini". As mentioned above, more complex data structures may be used in place of the file "vftranslate.ini", or it may be desirable to store translations in the registry.

To ensure complete virtualization, several restrictions must be placed upon the creation of new translations. Consider that a user is attempting to create a new translation to be stored in the file "vftranslate.ini". To create the new translation, the user must specify a new virtual file path and a new physical file path. When the new translation is created, the new physical file path of the translation should not exist on the hard drive. If the new physical file path does exist on the hard drive, it either represents an initial virtual-to-physical translation by default, as described above, or may already be associated with a virtual translation already stored in the file "vftranslate.ini". If such a new translation were allowed to be created, the files of two or more virtualized directories would become mixed. This would comprise the virtualization of the file system. However, it may be desirable to override this rule, such as in the example above wherein all accesses to a particular DLL file are redirected to a single directory.

Because of this restriction, the user should not be allowed to edit the file "vftranslate.ini". Rather, a translation configuration utility, in accordance with the present invention, should be used to update the file. The utility should provide a warning to a user when the user attempts to create a new translation having a new physical path that already exists on the hard drive or exits in the file "vftranslate.ini" as a physical file path. The user can then be given the option to select a different new physical file path that does not yet exist (the name of which can be generated by the translation configuration utility), or the user can be given the option to override the warning.

Now consider the new virtual file path specified by a user when creating a new translation. If the new virtual file path already exists in identical form in the file "vftranslate.ini" as the virtual file path of an existing translation, a warning should be provided to the user. The user should then be given the option to abort the translation entry or to delete or modify the prior translation. If the new virtual file path does not exist in the file "vftranslate.ini", but is present on the hard drive as a physical path, then a prior translation already exists between the new virtual file path and the identically named physical file path by default, as described above. In this case a warning should be presented to the user. The translation configuration utility can provide the user with the option to move the contents of the identically named physical path to the new physical file path of the translation being created, or the user can be given the option to create an additional new translation for the identically named physical file path, thereby allowing the "old" identically named physical file path to be accessed by a new virtual file path. Note that this last option may be useful if the user wants to create a temporary translation to a directory, (such as a directory containing a beta version of a program) and restore the original translation later. In this case, the user would select a "placeholder" virtual file path when creating the additional new translation. One final feature that should be provided by the translation configuration utility is the ability to prioritize the translations in the file "vftranslate.ini". This can be accomplished by allowing the user to change the relative positions of the translations in the file "vftranslate.ini", or by any other appropriate mechanism.

Now consider how file access requests must be handled in the second embodiment of the present invention by virtual file system translation driver 42 in FIG. 2. Two cases must be considered; file access creation requests that seek to create a new virtual file path and existing file access requests that seek to access an existing virtual file path. First, consider an existing file access request. If a translation is present the virtual file path is translated to a physical file path. If a translation is not present and the virtual file path does not exist in the file "vftranslate.ini" as a physical file path, then the file access creation request is passed on to file system driver 26 in FIG. 2 because a default translation exists between the virtual and physical file paths, as described above.

However, if a translation is not present and the virtual file path does exist in the file "vftranslate.ini" as a physical file path, then applications and system utilities 16 in FIG. 2 must not be allowed to see to see the contents of the physical file path. This is required to provide a truly virtualized view of the file system. Accordingly, virtual file system translation driver 42 must return a "file path not found" message and must not pass the request on to file system driver 26.

Now consider a file access creation request. If a translation is present for a file access creation request the virtual file path is translated to the physical file path. If a translation is not present for a file access creation request, and the virtual file path does not exist in the file "vftranslate.ini" as a physical file path, then the file access creation request is passed on to file system driver 26 in FIG. 2. When the file path is created, a default translation is created by definition, as described above.

However, now consider what happens when a file access creation request attempts to create a file path that already exists in the file "vftranslate.ini" as a physical file path. For example, assume that the user has issued a command to create the directory "d:\My Documents", and the file "vftranslate.ini" contains a translation that translates the virtual file path "c:\My Documents" to the physical path "d:\My Documents". Such a file access creation request cannot be allowed to create an identically named physical file path because it already exits, and doing so would combine two virtual file paths into a single physical path. The solution to this problem is have virtual file system diver 42 of FIG. 2 create a new translation in the file "vftranslate.ini".

Figure 4:
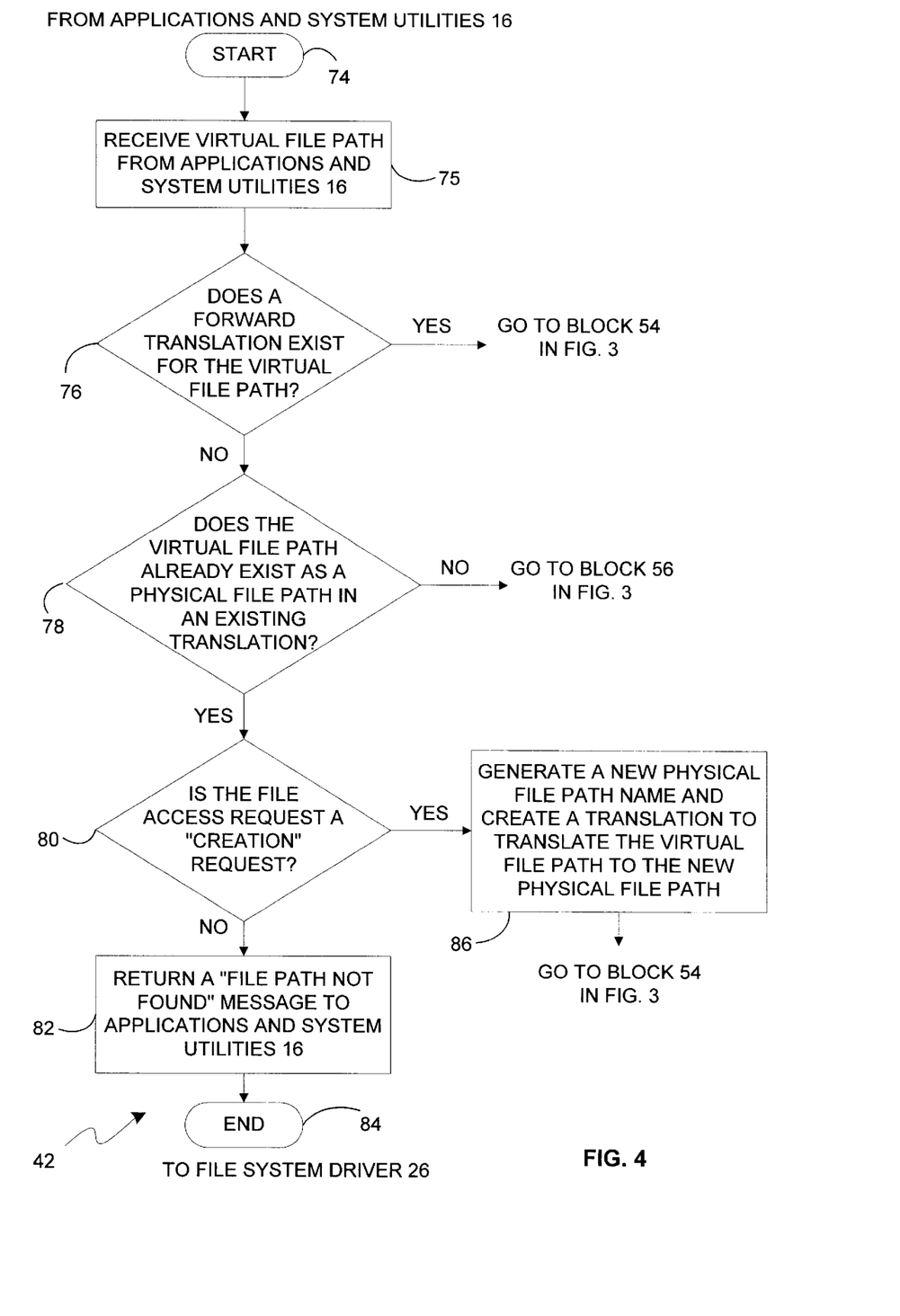
FIG. 4 is a flow chart that illustrates how the virtual file system translation diver of FIG. 2 translates file requests from applications and system utilities in accordance with a second embodiment of the invention.

FIG. 4 is a flow chart that illustrates how virtual file system diver 42 functions in accordance with the second embodiment of the present invention. Note that the flow chart of FIG. 4 only illustrates the first phase of the file access request. The second phase of the file access request in the second embodiment is processed in the same manner as the second phase in the first embodiment, as shown in blocks 62, 64, 66, 68, 70, and 72 of FIG. 3. Also note that the first phase of the second embodiment uses some of the steps shown in the first phase of the first embodiment in FIG. 3, as will be described below.

Referring first to FIG. 4, in the first phase of the file access request in accordance with the second embodiment of the present invention, driver 42 begins execution at "start" block 74, and receives a virtual file path from applications and system utilities 16 at block 75. Next, decision block 76 determines whether a forward translation exists for the virtual file path. If a translation exists, the "YES" branch is taken to block 54 in FIG. 3 to translate the virtual file path into the physical file path, and processing continues as discussed above with reference to FIG. 3. If a translation does not exist, the "NO" branch is taken to decision block 78.

Decision block 78 determines whether the virtual file path already exists as a physical file path in an existing translation. If the virtual file path does not exist as a physical file path in an existing translation, a default virtual-to-physical translation exists and the "NO" branch is taken to block 56 in FIG. 3. Thereafter, processing continues as discussed above with reference to FIG. 3. If the virtual file path does exist as a physical file path in an existing translation, this physical file path must be hidden from applications and system utilities 16. Accordingly, the "YES" branch is taken to decision block 80.

Decision block 80 determines whether the file access request is a file creation access request. If it is not, the "NO" branch is taken to block 82. Block 82 returns a "file path not found" message to applications and system utilities 16, and processing stops at "end" block 84. In this situation, the file access request will not have a second phase.

However, if the file access request is a file creation access request, the "YES" branch is taken to block 86. Block 86 first generates a new physical file path name, and then creates a translation to translate the virtual file path to the new physical file path. Since the user will not see the new physical file name, any name can be used. For example, as discussed above, assume that the user has issued a command to create the directory "d:\My Documents", and the file "vftranslate.ini" contains a translation that translates the virtual file path "c:\My Documents" to the physical path "d:\My Documents". In this situation, block 86 can generate a new physical file name such as "d:\My Documents~001" and enter a translation in the file "vftranslate.ini" to translate "d:\My Documents" to "d:\My Documents~001". Since a translation now exists, control passes to block 54 in FIG. 3 and processing continues as discussed above. If the user ever tries to view "d:\My Documents~001", the "NO" branch will be taken from decision block 80 to block 82 and the user will receive a "file path not found" error. If the user ever tries to create the directory "d:\My Documents~001", the "YES" branch will be taken from decision block 80 to block 86 and a new translation will be generated. For example, the directory "d:\My Documents~001" can be translated to "d:\My Document~002". The only restriction on the generation of new physical file paths is that the new physical file path should not already exist as a physical file path in the file "vftranslate.ini".

One of the advantages of the second embodiment of the present invention is that an existing physical file system can be completely virtualized by simply installing virtual file system translation driver 42 and the translation configuration utility discussed above. Another advantage of the second embodiment is that it allows a boot partition to be virtualized. Assume that a user's computer has a single hard drive having a single partition from which the computer is booted. As the operating system is booting up, the virtual view of the file system is not available until virtual file system translation driver 42 has been loaded. But this does not cause any problems as long as the files required to boot the computer system are found at the physical file paths at which they are expected to be located. Once driver 42 has been loaded, these files can be viewed and manipulated because the default translation, by definition, creates virtual-to-physical translations for files already existing on the hard drive that do not have a translation entry in the file "vftranslate.ini". Note that in the second embodiment of the present invention, it may be desirable to not allow the default translation for boot files to be altered. In other words, the translation configuration utility should not be allowed to create a translation that alters the location of a file needed to boot the computer.

In the third embodiment of the present invention, all files are virtualized and there are no existing default translations between virtual and physical file paths. In addition, there may be little or no correspondence between virtual file path names and physical file names. Because all files are virtualized, all files required to boot the computer system (up to the point that virtual file system translation driver 42 is installed and functioning) must have identically named virtual to physical translations so that the files required to boot the computer can be physically accessible while the computer is booting and virtual accessible after driver 42 is functioning. The third embodiment may be most useful when employed by system administrators that seek to control the location where a user's files are stored, and may be especially useful when virtualizing networked drives.

Basically, the steps required to implement the third embodiment of the present invention are a subset of the steps required to implement the second embodiment of the present invention. Specifically, in FIG. 4 decision block 78 is eliminated and the "NO" branch of decision block 76 flows to decision block 80. Accordingly, when a virtual file path is received by virtual file system translation driver 42, if a translation already exists the "YES" branch is taken to block 54 in FIG. 3. If a translation does not exist and the file access request is an existing file access request, a "file path not found" message is returned at block 82. Finally, If a translation does not exist and the file access request is a file creation access request, a new translation is generated at block 86 and control passes to block 54 in FIG. 3.

Note that the physical directory structures created by the new translations generated by block 86 need not resemble the virtual directory structures. As a matter of fact, with the exception of the files required to boot the computer system, as described above, a new translation may be generated for every single file and the resulting physical directory structure may be completely flat.

To facilitate the above discussion of the three embodiments of the present invention, it was generally assumed that a single user was virtualizing a file system. However, it will probably be more common for a network administrator to configure a virtual file system in accordance with the present invention in such a way that the virtualization is transparent to the user. As is known in the art, a Windows NT® workstation has a default administrator account, and additional user accounts can be created and configured using the User Manager application. In addition, system administrators can administer user accounts remotely, and user access can be validated using a remote domain controller. Note that in accordance with the present invention, an administrator may wish to establish a separate virtual file system for each user. For example, it may be desirable for each user of workstation to have a virtual file path for the directory "c:\My Documents", since this is a default directory used by many Microsoft® applications and users are familiar with this directory. However, it would not be desirable for all users to share a common "c:\My Documents" directory. Accordingly, an administrator can create a separate translation for each user, such as:

c:\My Documents\* c:\My Documents_userXXX\* where XXX are the initials of the user.

Note that in the second embodiment of the invention, physical file paths are hidden, while in the first embodiment, physical file paths are not hidden. However, an administrator can use the first embodiment of the invention and yet still hide the physical file path by setting the permissions and attributes of the physical file path using prior art techniques.

Figure 5:
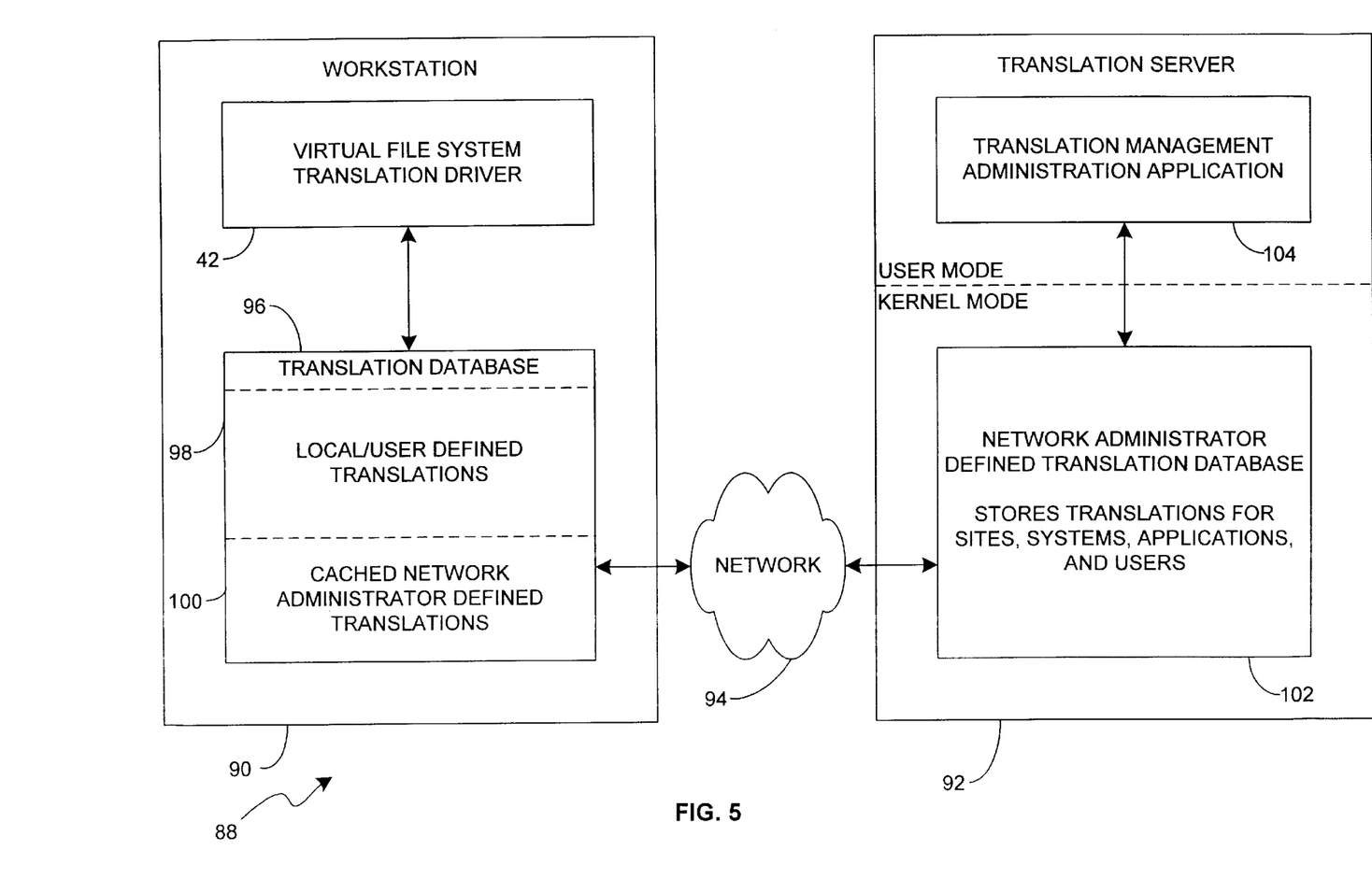
FIG. 5 shows a workstation and a translation server coupled together by a network, and illustrates how a network administrator can manage translations in accordance with the present invention.

FIG. 5 shows a computer network 88 and illustrates how a network administrator can manage translations in accordance with the present invention. Network 88 includes workstation 90 and translation server 92, which are coupled together by network 94. Workstation 90 includes virtual file system translation driver 42 of FIG. 2 and translation database 96, which performs the function provided by the file "vftranslate.ini" above. Translation database 96 is partitioned into local/user defined translations 98, which are defined by a local user or administrator, and cached network administrator defined translations 100, which are defined remotely be a network administrator. Translation server 92 includes network administrator defined translation database 102, which stores translations for sites, systems, applications, and users, and translation management administration application 104, which operates in user mode and allows a network administrator to create and manage translations.

When a user logs into workstation 90, the user's login information is also transmitted to translation server 92. Translation server 92 responds by transmitting the translations that have been defined by the network administrator for the site, for workstation 90 (the system), for the applications on workstation 90 used by the user, and any translations particular to the user. Workstation 90 stores these translations in the cached network administrator defined section 100 of translation database 96, and the translations need not be transmitted again to workstation 90 unless the translations are altered in network administrator defined translation database 102 of translation server 92, or the user logs out and another user logs in. Also note that since the network administrator defined translations are retained in translation database 96, if workstation 90 is used when not connected to network 94, the translations will still be available.

Note that the operation of translation server 92 is somewhat analogous to the operation of a domain server in a Windows NT® network. Accordingly, in another embodiment of the invention, translation server 92 can be included in a combined domain/translation server so that when a user logs into the domain server, the translations are also provided to the workstation.

As mentioned above, it is within the scope of the present invention to allow translations to be defined separately for each application. For example, it may be desirable to translate the virtual file path "c:\My Documents" associated with a word processor program to the physical file path "c:\My Documents-wp", and to translate the virtual file path "c:\My Documents" associated with a spread sheet program to the physical file path "c:\My Documents-ss". Often unsophisticated users become confused by directory tree structures, and by creating separate virtual default directories for each application the user's confusion can be diminished. Of course, there are many other are situations where it may be desirable to create virtual file translations on a per application basis.

It is also within the scope of the present invention to define translations that are mandatory, and to define translations that are preferences. For example, a network administrator many define a preferred translation to redirect the directory "c:\My Documents" to a network server, where the files are backed-up daily, and the user may wish to define a mandatory translation to redirect the directory "c:\My Documents" back to its original location.

Figure 6:
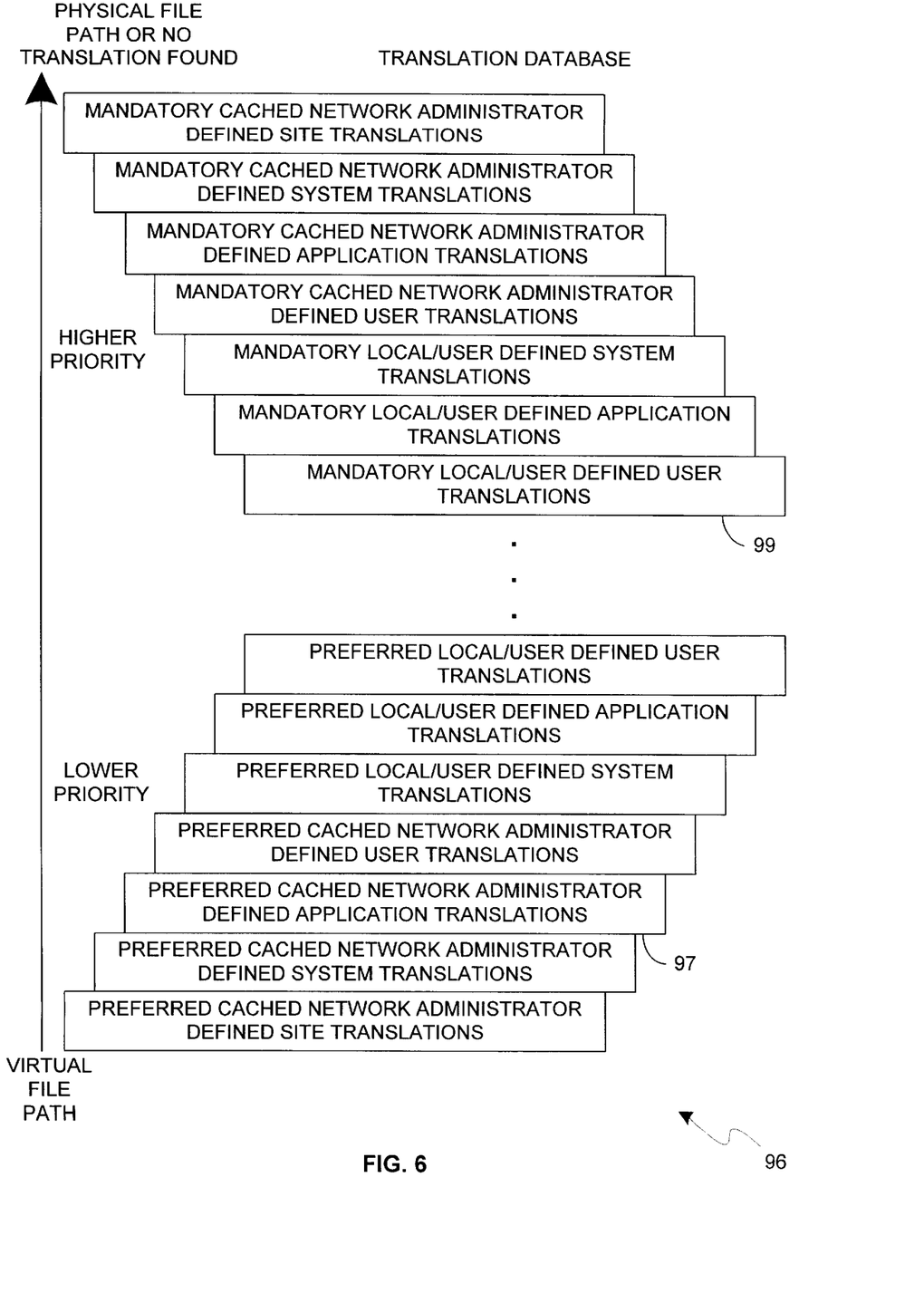
FIG. 6 is a block diagram illustrating a prioritization scheme that manages translations in accordance with an embodiment of the present invention.

In view of all the different ways of categorizing translations in accordance with the present invention, managing all the translations can become quite complex. FIG. 6 is a block diagram illustrating a prioritization scheme 96. Prioritization scheme 96 illustrates one method of managing translations in accordance with the present invention. In scheme 96, a virtual file path is presented at the bottom of FIG. 6, and each translation category is searched for a matching translation. The translation categories are prioritized in ascending priority order from bottom to top. After the last translation category has been searched at the top of FIG. 6, the last translation found will be the translation used (or no translation will be found). Note that all other information required to match a category must be provided also, such as user name or the application. Also note that other categories may be added to scheme 96.

As in example, assume that the network administrator has created a preferred translation to translate the virtual file path "c:\My Documents" to the physical file path "g:\user1\My Documents" (which is located on a networked drive) when the user is using Microsoft® Word. The network administrator would create the translation using translation management administration application 104 in FIG. 5, and the translation would be stored in network administrator defined translation database 102 in FIG. 5. When the user logs in, the translation will be cached to translation database 96 of workstation 90 via network 94. In FIG. 6, this translation will be stored in category 97 of scheme 96. Now assume that the user wishes to redirect all references to "c:\My Documents" to "d:\My Documents". The user can enter this translation in category 99 of scheme 96, and the user's translation will take precedence over the network administrator's translation. Note that in scheme 96, all of the network administrator's mandatory translations have higher priority over the user's mandatory translations, giving the network administrator ultimate control over the translation.

Figure 7:
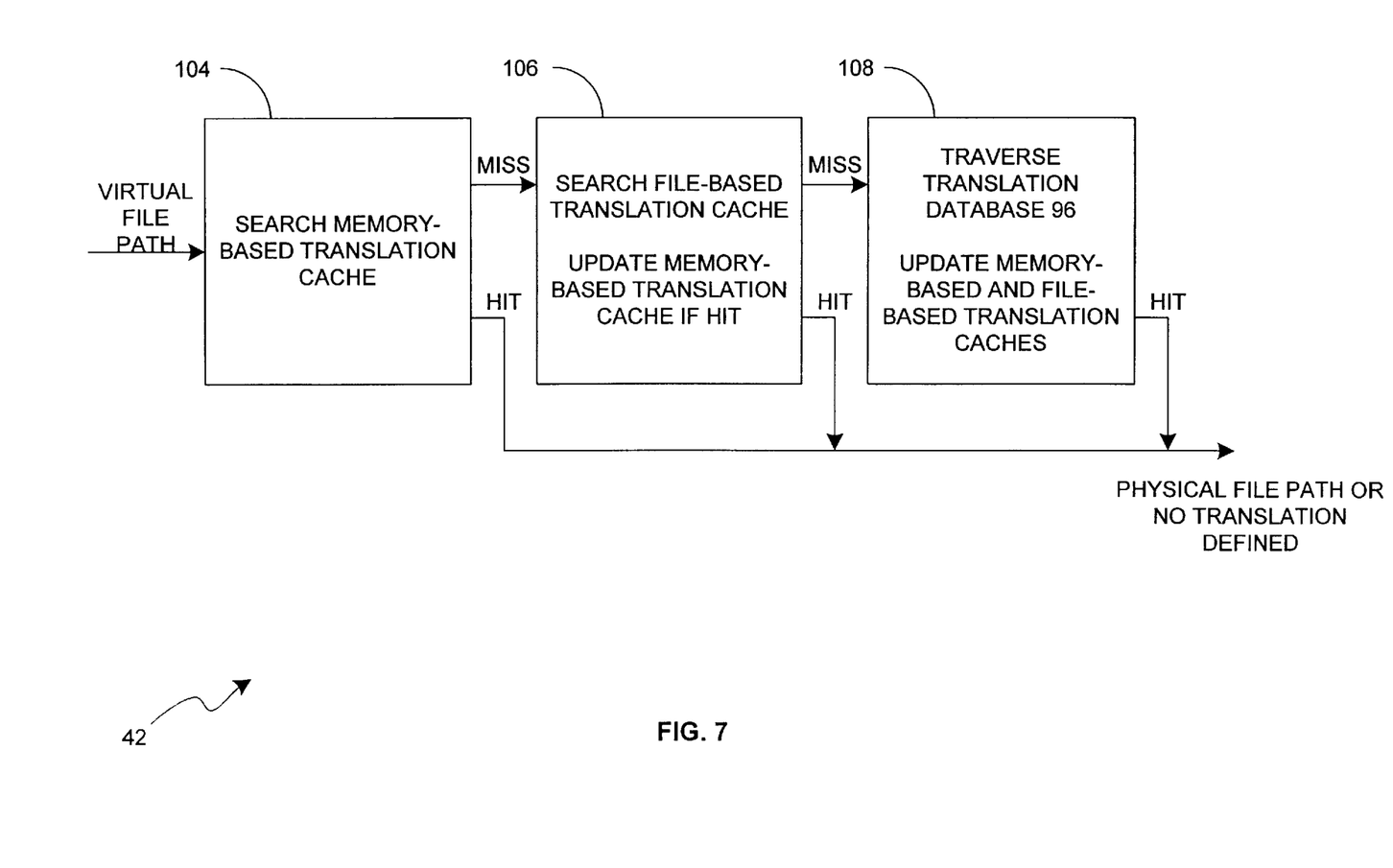
FIG. 7 is a block diagram illustrating memory-based and file-based translation caches for use with the virtual file system translation driver of FIG. 2.

Given the complexity of translation scheme 96, it may take relatively long to traverse the translation database. In accordance with the present invention, virtual file system translation driver 42 can be provided with memory-based and file-based translation caches. FIG. 7 is a block diagram illustrating the operation of the caches. In FIG. 7, a virtual file path (and all other required information, such as the user name and application) is provided to block 104. At block 104, the memory-based translation cache is searched to determine if the memory-based translation cache contains a translation or an indication that no translation exits. If there is a hit, then physical file path of the translation has been found, or there is no translation. If there is a miss, then control passes to block 106. At block 106, the file-based translation cache is searched to determine if the file-based translation cache contains a translation or an indication that no translation exits. If there is a bit, then physical file path of the translation has been found, or there is no translation, and the memory-based translation cache is updated. If there is a miss, then control passes to block 108. Finally at block 108 translation database 96 is traversed to find the translation or determine whether a translation does not exist. Block 108 also updates both the memory-based and file-based translation caches. As long as a translation (or indication that no translation exists) is stored in a translation cache, translation database 96 does not need to be accessed. If a translation in database 96 is created, altered, or deleted, the translation caches must be updated or purged to keep the translations coherent.

In the discussion above, the present invention was described primarily with reference to a workstation. However, those skilled in the art will recognize that the present invention can also be installed on a server to virtualize the network file paths of files stored on the server. When a server receives a request from a workstation (via a network connection) to access a file path stored on the server, the request will flow up the network protocol stack of the server to a server module, as is known in the art. Thereafter, the server module will retrieve the file from one of the storage devices coupled to the server by processing the file access request using virtual file system translation driver 42, as described above. The results are then transmitted to the workstation through the network protocol stack.

Note that the present invention can also be used to virtualize other types of I/O operations. For example, using the concepts described above, a print request can be redirected from one printer to another. Thereby allowing a network administrator to redirect a print request from a malfunctioning printer to a working printer in a manner transparent to the user. Similarly, web addresses and other URLs can be virtualized.

Note that it is also possible to use the concepts described above to translate an I/O request from one type of resource to another. For example, a virtual file path can be translated to an executing computer program. Consider that a user has a spreadsheet that receives as an input a file containing a list of stock prices. The input file can be translated to an executable program that retrieves current stock prices over the Internet, and provides the results back to the spreadsheet in the form of a file access. In this way, the present invention can be used to enhance older legacy programs that only work with files to include modern Internet access features. Another example where such a translation could be useful is the generation of random numbers. A particular program may be configured to access a large file of random number. To provide better randomization and eliminate the large file, the file path can be translated to a program that generates random number on the fly.

One of the disadvantages provided by prior art file system is that the attributes of a particular storage device apply globally to all files in the file system. In essence, the attributes of the storage device are "joined at the hip" with the file system installed on the storage device. The present invention breaks this connection. Accordingly, a user can view a single file system, yet files within that file system can be stored on storage devices having different attributes. For example, temporary files and application executable files can be stored on a local hard drive where such files can be accessed quickly. The local hard drive does not need to be backed up because no harm will occur if the temporary files are lost, and the application executable files can be reinstalled. A user's document files can be translated to a network device with an aggressive backup schedule, thereby ensuring that the user will not lose more than one day's work. Similarly, database files that are essential to transaction processing can be translated to a RAID device that can suffer a drive failure while providing uninterrupted access to the files stored thereon. In the prior art, a user would need to store each type of file on the appropriate storage device. With the present invention, the user sees a single file system, yet each file can be translated to a storage device having the desired attributes.

In accordance with the present invention, it is possible to store preferred and mandatory attribute requests for each translation. Accordingly, a user could configure a translation to an important file as having a preferred destination on a RAID storage device, and a mandatory destination on a storage device with an aggressive backup schedule. When the translation is created remotely, the preferred and mandatory attribute requests are used when creating virtual to physical translation.

Another advantage provided by the present invention is that files can be moved from one storage device to another, and the translations can be adjusted on the fly as the files are moved. Assume that a user has configured a translation to an important file as having a preferred destination on a RAID storage device, and a mandatory destination on a storage device with an aggressive backup schedule. The server initially assigns the file to the RAID storage device, but the RAID storage device becomes full. The server can transparently move the file from the RAID storage device to the storage device with an aggressive backup schedule, and update the translation. When space again becomes available on the RAID storage device, the server can move the file back.

As illustrated above, the present invention provides enormous flexibility and creates a host of new opportunities related to the management of files on workstations and servers. Although the present invention has been described with reference to preferred embodiments, workers skilled in the art will recognize that changes may be made in form and detail without departing from the spirit and scope of the invention

What is claimed is:

1. A method of processing a file access request comprising:

receiving a file access request containing a virtual file path from an application;

translating the virtual file path to a physical file path;

processing the file access request using the physical file path;

translating the physical file path back to a virtual file path; and completing the file access request to the application using the virtual file path.

* * * * *